Jan. 17, 1956   R. P. POWERS   2,731,065
TUBELESS TRUCK TIRE RIM AND VALVE
Filed Feb. 23, 1954
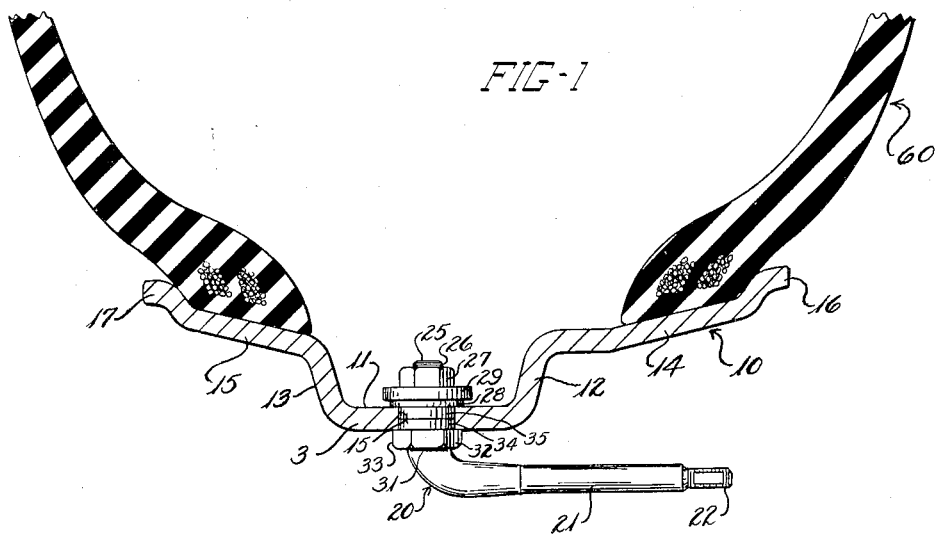
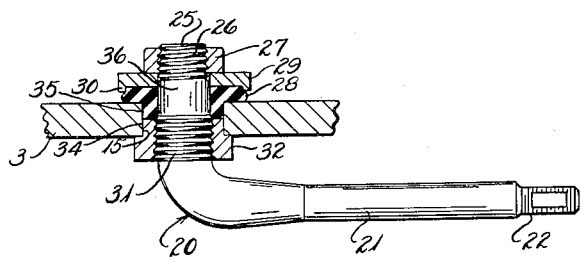
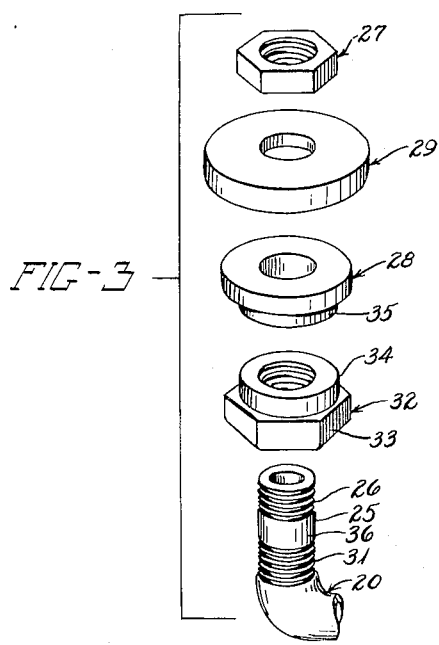
INVENTOR.
ROBERT P. POWERS
BY
W. A. Fraser
ATTY.

United States Patent Office 2,731,065
Patented Jan. 17, 1956

2,731,065

TUBELESS TRUCK TIRE RIM AND VALVE

Robert P. Powers, Akron, Ohio, assignor to The Firestone Tire & Rubber Company, Akron, Ohio, a corporation of Ohio Application February 23, 1954, Serial No. 411,777

2 Claims. (Cl. 152—427)

The present invention relates to valves for inflating tubeless tires, and it is particularly adapted for valves of the type which are removably attached to truck tire rims.

A tubeless truck tire of the type that requires the introduction of tire inflationary fluid through the tire rim has heretofore presented a serious problem in getting the required fluid-tight seal between the valve stem and the rim. One expedient has been to permanently attach the valve stem to the rim base as by welding. Permanent attachment of the valve stem to the rim simplifies the problem of obtaining an air-tight seal between the valve stem and the rim, but such constructions are not entirely satisfactory due to the fact that valve stems frequently become injured, and if the stem has been permanently attached to the rim, its replacement is frequently complicated. Means for removing a permanently attached valve stem, from the rim and replacing it, generally is not readily available to the user of the tire.

Another expedient of effecting said fluid-tight seal has been to use a valve stem of the type now in comomn use for tire inner tubes and provide a rubbery washer, or such washer and collar combined, about the stem between the tire rim and the valve base, the rubbery washer being so disposed that it seals the rim valve hole about the valve stem. The use of said washer has the advantage of making it convenient to remove and replace an injured valve stem, and presently it is the most generally used means of attaching the valve stem to tubeless tire rims.

Truck tire valve stems are often of considerable length, having a first extent from the base of the valve a sufficient length to pass through the valve hole in the rim and then a second and longer extent laterally of the rim, in order that the end of the stem, which houses the valve core, may be exposed and available for inflating the tire, by the application of the usual service station air chuck to the intake end of the valve stem. In service, the lateral extent of the valve stem referred to above is disposed between the radial inner surface of the rim and the wheel brakes of a truck. The space between said brakes and the rim in some makes and sizes of trucks is so small as to barely provide clearance for said valve stem. In cases of extremely close clearance for the stem, as just described, and in which said rubbery washers are used, a problem exists when it becomes necessary to tighten parts adjoining said washer against the washer to stop slow leaks. Unconfined rubber or rubber-like material when subjected to constant pressure, such as necessary to insure a fluid tight seal with adjoining rigid members, will gradually flow from the pressure area, as is well known to those familiar with the art. Such tightening infrequently becomes necessary due to the slow flow of the rubbery material, of which the washers are composed, away from the surfaces between which it is clamped. Since such tightening is done without demounting the tire, it must be done by tightening a nut in threaded relation with said first extent of the valve stem and so disposed as to tighten against the rim whereby the valve stem is drawn radially inwardly as will be understood by those familiar with the art. However, due to the close clearance between the brakes and rim explained above, it frequently has not been possible to stop slow leaks by such tightening because the lateral extent of the valve stem would come into contact with said brakes. When this occurs, the only alternative has been to demount the tire and replace the washer.

To solve the problem of slow leaks or washer flow referred to above, it has been suggested that the volume of rubbery material be decreased or a washer of harder rubber be used. Such washers have not been found satisfactory since a substantial thickness of washer and softness of the rubber or rubbery material has been found necessary to insure an air-tight seal between the rim and valve stem.

Applicant has found that if the original tightening against the washer is radially outwardly of the rim thus drawing the lateral extent of the stem toward the rim, the tire and valve assembly can be mounted in air sealed condition with little or none of the clearance between the rim and brake sacrificed or used up in the initial tightening against the washer. Accordingly, when a tubeless truck tire is run in service and a slow leak develops between the valve stem and rim, there will be sufficient clearance between the lateral extent of the valve stem and the brake to draw the valve stem toward said brake and tighten the washer between the stem and rim without demounting the tire which is a principal object of the present invention.

Referring to the drawing:

Fig. 1 is a fragmentary perspective view, partly in section, of a valve, tubeless truck tire and truck tire rim assembly embodying the present invention, illustrating their relative positions in the assembly in service;

Fig. 2 is a fragmentary sectional view showing the rim, a gasket, stem and the stem associated parts as they appear assembled but before the initial compression of the washer; and Fig. 3 is an exploded perspective view illustrating nuts and washers associated with said valve stem and rim in the assembly shown in Fig. 1.

Referring now to the drawings in more detail, it will be seen, by reference to Fig. 1, that the invention comprises a rim referred to generally as 10. Rim 10 is a one piece endless rim and includes a well 11, well sidewalls 12, 13, tire bead seats 14, 15 and relatively small side flanges 16, 17.

The bottom of well 11 forms the base 3 of rim 10. Rim base 3 has a round valve hole 15 adapted to receive an angular valve stem or so-called angle valve stem referred to generally as 20. Stem 20 comprises a long barrel portion 21 having an end portion 22 with both external and internal threads to receive a valve cap and valve core respectively. The opposite and short end 25 of stem 20 terminates in a threaded portion 26 which projects radially outward from rim base 3 and receives in threaded relation a nut 27. End 25 also receives, between nut 27 and rim base 3, a rubber or rubber-like washer 28 and a metal or rigid washer 29, washer 29 being interposed between nut 27 and washer 28. As will be seen by reference to Fig. 3, washer 28 is adapted to overlie base 3 adjacent valve hole 15 and has a round projection 35 that surrounds a portion of stem 20 in valve hole 15 and normally fits in said valve hole. Washer 29 has a shallow recess formed by a flange 30, which flange fits over the edge of washer 28 thereby preventing, to some extent, the lateral distortion and flow of washer 28 when the latter is under compression as shown in Fig. 1.

Stem portion 25 has a second thread portion 31 which receives a nut 32 in threaded relation therewith as shown in Figs. 1 and 2. Nut 32 has a hexagonal head 33 and a rounded extension 34 adapted to fit into rim valve hole 15 and contact washer 28. Head 33 of nut 32 registers against the radial inner surface of rim 10 about valve hole 15 where it limits the radial outer movement of stem 20 through valve hole 15 when nut 27 is tightened against washer 29 to squeeze washer 28 to form an air seal and to distort portion 35 against the sides of rim valve hole 15 and a smooth stem portion 36, whereby the air seal is additionally provided and maintained as will be explained hereinafter.

The assembly of the tire rim and valve stem is made by first placing nut 32 in position on stem 20 as shown in Fig. 2 after which end 25 is projected through the valve hole 15 in rim base 3 and washers 28 and 29 and nuts 27 placed in the position as also shown in Fig. 2. It is to be noted that the portions of nut 32 and washer 28 which extend into hole 15 are assembled in contact with each other. The next step is to tighten nut 27 against washer 29 thereby drawing nut 32 firmly against the rim base and squeezing washer 28 between washer 29 and the rim base while at the same time distorting portion 35 of washer 28 firmly against the stem 20 and the sides of hole 15, whereby an air seal at the rim valve hole is provided. It is the gist of the present invention that the initial seal at the rim valve hole is formed with the portion 21 of valve stem 20 as close to the rim base as possible, thus providing the maximum clearance between the stem and the brake, and that means are provided for additional tightening of the seal by drawing stem portion 21 toward the brake. As indicated hereinbefore, washer 28 will gradually flow from between pressure members and that clamping means must be tightened from time to time to maintain an air seal. The need for such tightening is demonstrated by the common practice of tightening the nut on tire inner tubes occasionally to stop slow leaks at the valve. This rubber flow is aggravated in truck tires due to the high temperature the tires reach which sometimes is extreme when brakes become over-heated.

After the stem and rim have been assembled as just explained, the tubeless tire 60 is mounted on rim 10 and inflated in the usual manner.

It will now be seen that in the event, during service of the assembly, a slow valve leak develops due to the flow of the gasket 28, applicant's valve structure provides means for further tightening the clamping surfaces against washer 28 and also space between the valve stem in the original assembly and the brake to permit such tightening. This additional tightening is effected by the simple expedient of tightening nut 32. In prior art constructions, the necessary initial tightening drew the valve stem radially inwardly from the rim base so far that in such mountings, with which the present invention is concerned, there was left insufficient clearance between the stem and the brakes for further radial inward travel of the stem. Accordingly, the tire had to be demounted and the sealing member replaced to stop a valve leak.

The detailed description of the particular embodiment of the invention illustrated and described herein is not to be construed as limiting the invention thereto. The invention includes all features of patentable novelty residing in the foregoing description and the accompanying drawing.

What is claimed is:

1. A tire rim and valve stem assembly for a tubeless truck tire, said rim having a valve stem hole in a base portion thereof, said stem being of the angle type and having an end portion projected radially outwardly through said valve stem hole and a distance therebeyond, said projected end being externally threaded and having a nut in threaded relation therewith; a rubber-like washer, said rubber-like washer having a cylindrical portion projecting into said rim stem hole about said stem and having a flange portion overlying the rim base about said stem hole, said stem having a second thread portion exposed radially inwardly from the rim base, a second nut in threaded relation with said second threaded portion disposed in contact with the radial inner surface of the rim base and having a cylindrical portion projected into said valve hole and in contact with the cylindrical portion of the rubber-like washer, whereby said first mentioned nut may be tightened on the stem to provide an initial airtight seal at said valve hole before a tire is mounted on the rim and the second mentioned nut may be used for additional tightening of the rubber-like washer when a tire is mounted on said rim.

2. A tire rim and valve stem assembly for a tubeless truck tire, said rim having a valve stem hole in a base portion thereof, said stem being of the angle type and having an end portion projected radially outwardly through said valve stem hole and a distance beyond said base; said projected end being externally threaded and having a nut in threaded relation therewith; a rigid washer on the valve stem adjoining said first mentioned nut; a rubber-like washer, said rubber-like washer having an integral cylindrical portion projecting into said rim stem hole about said stem and having a flange portion overlying the rim base about said hole, said stem having a second threaded portion exposed radially inwardly from the rim base, said stem having a smooth portion intermediate said first and second threaded portions; a second nut in relation with said second threaded portion disposed in contact with the radial inner surface of the rim base and having an integral cylindrical portion projected into said hole and in contact with the cylindrical portion of the rubber-like washer, whereby said first mentioned nut may be tightened on the stem to provide an initial air tight seal at the valve stem hole before a tire is mounted on the rim and the second mentioned nut may be used for additional tightening of the rubber-like washer when a tire is mounted on said rim.

References Cited in the file of this patent

UNITED STATES PATENTS

| Number | Name | Date |
| --- | --- | --- |
| 1,966,580 | Bull | July 17, 1934 |
| 2,277,885 | Rodanet | Mar. 31, 1942 |
| 2,493,452 | Grigg | Jan. 3, 1950 |
| 2,563,787 | Keefe | Aug. 7, 1951 |
| 2,587,470 | Herzegh | Feb. 26, 1952 |
| 2,685,907 | Waddell | Aug. 10, 1954 |